June 21, 1938.    L. L. J. PROMPT    2,121,445
CONTROL MECHANISM
Filed Dec. 29, 1936    3 Sheets-Sheet 1

LUCIEN LOUIS JOSEPH PROMPT
INVENTOR
By
his Att'y.

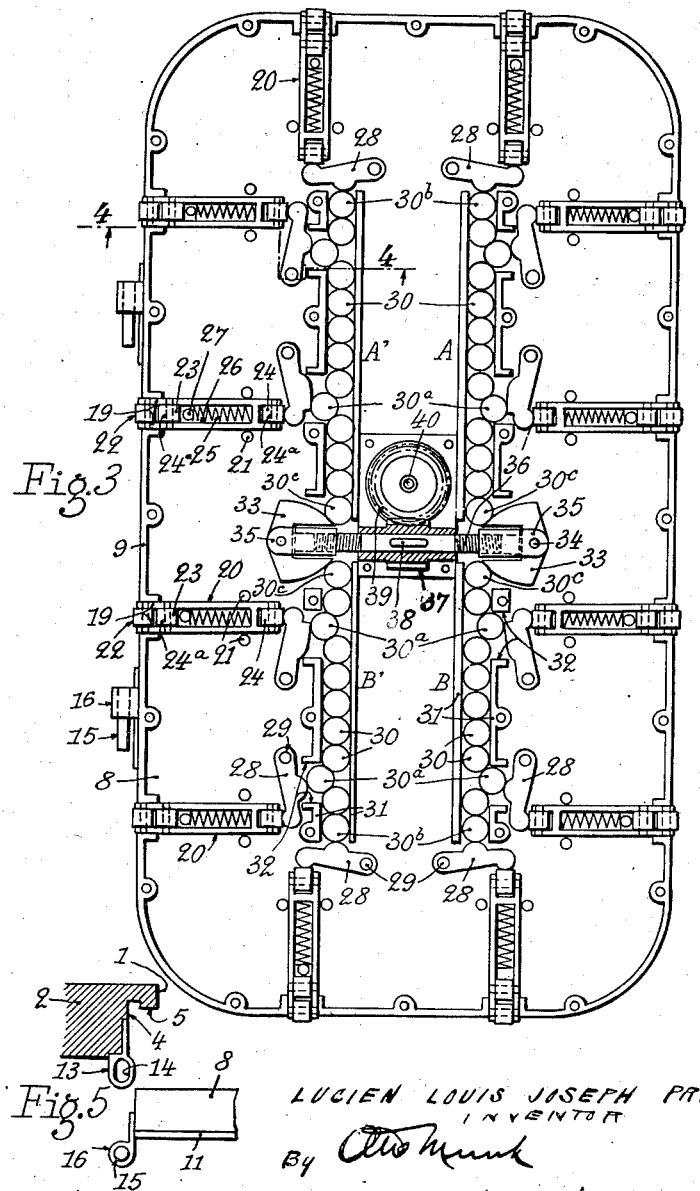

LUCIEN LOUIS JOSEPH PROMPT
INVENTOR

Patented June 21, 1938

2,121,445

UNITED STATES PATENT OFFICE 2,121,445

CONTROL MECHANISM

Lucien Louis Joseph Prompt, Colombes, France

Application December 29, 1936, Serial No. 118,172
In France January 7, 1936

5 Claims. (Cl. 292—33)

The present invention has for its object a device for the simultaneous operating of several mechanical parts. It may be used for the simultaneous operation of attaching means, for the simultaneous feed of tools and in general in every case in which different parts are to be moved simultaneously while allowing a relative displacement of said parts with respect to each other. The said device is chiefly characterized by the fact that it comprises, in combination, an operating mechanism and one or more rows or piles of rollers, balls, or the like, which are moved by the said mechanism; the parts to be actuated, or certain of these, are in contact with a certain number of the balls or rollers, these being set out laterally from the corresponding axis, row or pile, in the direction of the effort which is to be produced, and a certain number of mechanical parts may be actuated by the balls or rollers situated at the ends of the piles or rows.

The said invention further relates to the various applications of this device, and particularly to its application for the closing of doors, panels and other devices, and especially for the devices which provide for the tight closing of openings communicating with premises or with apparatus which must at times be tightly closed, such as doors for access and ventilation panels for casemates and for shelters against war gas, watertight doors and panels for boats and for submarine apparatus, tight cabin doors for aircraft, doors and panels for the closing of drying rooms, autoclaves, filters and the like.

For such purposes, the actuated parts consist of door-latches, hooks, pivoting levers or analogous locking members, which are distributed upon the whole or a part of the periphery of the door or panel, or of its stationary frame; the mechanism or mechanisms for the control, as well as the balls, rollers or the like, are mounted upon the said door or panel, or upon said frame, and the said door-latches, hooks, levers or the like, co-operate with staples or like retaining means provided in the said frame, or in the door or panel.

The door-latches, hooks, levers or the like and the staples have preferably such construction that when the said latches or the like enter the staples, this will automatically cause a displacement of the door or panel perpendicularly to its plane and in the direction in which it will be brought close to the frame in such way as to ensure the proper locking pressure and hence a tight fit of the door.

This result is obtained by giving to one of the two surfaces of contact of each door-latch, hook, lever or the like, or its staple, an inclined direction.

In the case in which the staples have the inclined or bevelled surfaces, the latches or the like are preferably provided with rollers adapted to make contact with the inclined surfaces of the staples.

Further characteristics will be set forth in the following description.

The accompanying drawings, which are given solely by way of example, represent a door for the tight closing of the access door of a casemate or of a shelter against war gas, said door being provided with a tight closing device as above set forth.

Fig. 3 is a view of the door which has the same position as in Fig. 1, but the outer panel is removed in order to show the mechanism, the balls and the door-latches.

Fig. 4 is a horizontal section on the line 4—4 of Fig. 3, showing the position of the latches with reference to the inclined planes of the staples, and also the position of the packing member.

Fig. 5 shows a form of hinge permitting the movement of the door in the proper direction for flattening the said packing member during the locking operation.

Figures 1, 2:
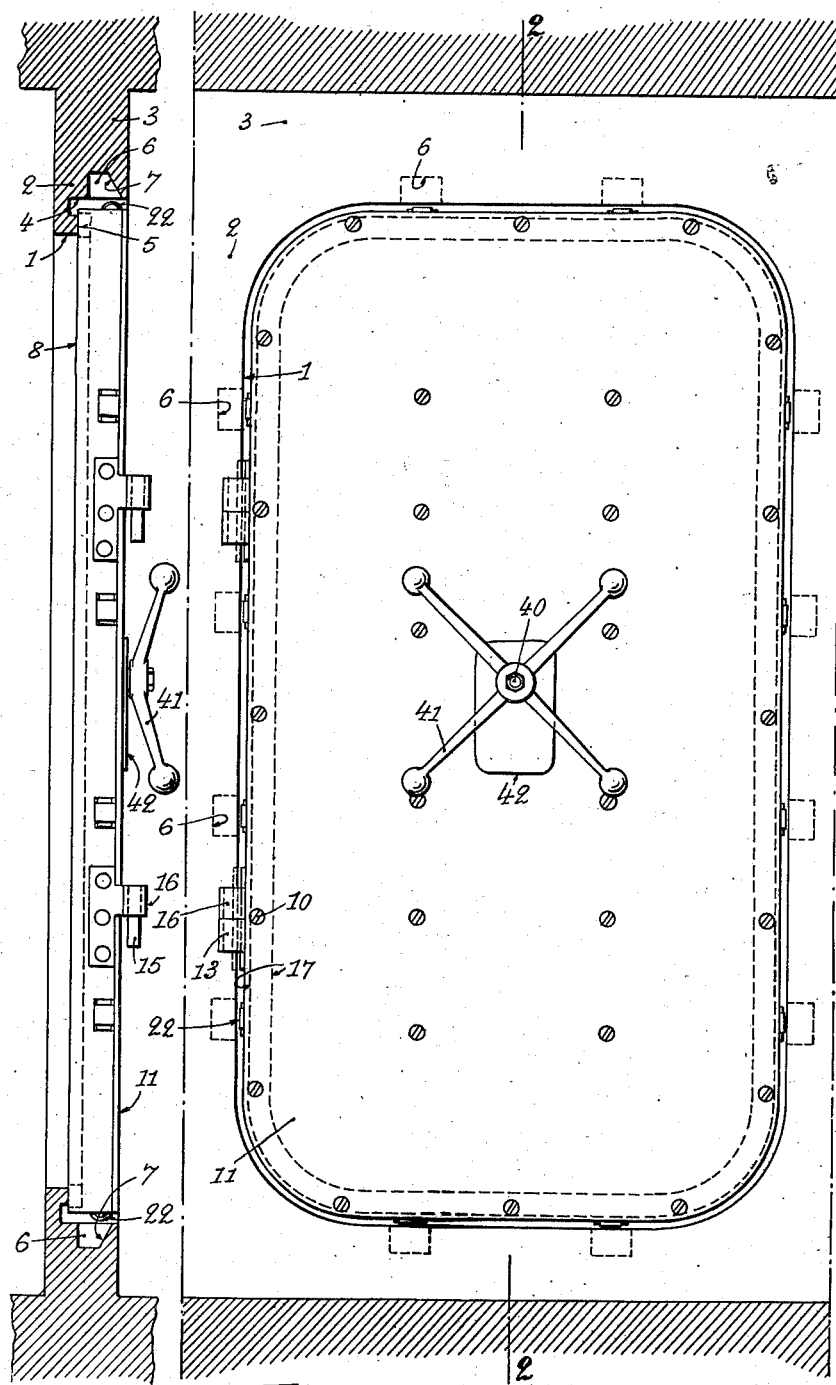
Fig. 1 is an outer front view, on the operating side, of the door which is in position in its frame but is not tightly shut.
Fig. 2 is a side view of the door, with a section on the line 2—2 of Fig. 1, of the partition, or frame, in which it is placed.

In the embodiment shown in Figs. 1 to 5, the door or panel, which may have any direction (vertical, horizontal or oblique) and any suitable form (rectangular, with rounded corner, oval, etc.) is adapted to cover an opening 1 formed in a frame 2 (Figs. 2—4—5); the said frame may be secured to the wall or partition 3 or may be integral with the same. The said frame carries a rabbet 4 (Fig. 4), at the back of which is a projecting bead 5.

In the lateral faces of the rabbet 4 there are provided, at certain intervals, and with equal or unequal spacing, recesses 6 forming staples (Figs. 1—2—4). The faces 7 of said staples which are opposite the bead 5 are cut on a bevel, i. e. obliquely with reference to the faces of the wall 3, the width of the staple diminishing from its opening to the back part.

The door or panel consists of a body 8 around whose whole periphery is a rib or raised edge 9 (Fig. 3) cast with or secured to the same and to which is applied and secured by screws 10 (Fig. 1), bolts or the like, a surface plate 11 (Figs. 1—2—4—5), and between the said plate and the body 8 is thus formed a cavity 12 containing the whole of the mechanism which will be further described.

The door may be connected with the frame by any known means, under the condition that such means will provide for a movement of translation of the door perpendicularly to its plane, so that the door may be pressed upon its frame. In the present case, the door is mounted on hinges; one of the hinge-plates 13 (Fig. 5) has an oval aperture 14 whilst the axle 15 mounted on the other hinge-plate 16 has a circular section.

A packing member 17 (Figs. 1—4) is contained in a groove 18 formed in the periphery of the door body 8. The material of said member may be as desired (indiarubber, leather, metal, etc.). The packing member 17 is adapted to make contact, when the door is closed, with the bead 5 of the frame 2; said bead has the same shape as the packing member 17, but it has a less width, so that it will not make contact with the edges of the groove 18.

In the outer edge 9 of the door body 8 are formed notches 19 (Fig. 3) adapted for the movement of the door-latches 20 (Fig. 3). The said latches are also guided by axles 21 (Fig. 3) secured to the body 8. The said latches are spaced around the periphery of the door or panel in such way as to coincide with the staples 6.

Each door-latch carries:

A roller 22 (Figs. 1—2—3—4) adapted to make contact with the inclined surface 7 of the corresponding staple 6.

A roller 23 adapted to make contact with the body 8 and to exert thereon a pressure in the direction perpendicular to its plane when the roller 22 is driven against the inclined plane 7.

A third roller 24, adapted to receive the reaction of the latch in the contrary direction, while bearing against the panel 11 which closes the body 8.

Each of the said rollers 22—23—24 turns about a respective axis 24ª mounted on the latch.

Each latch is brought back, when the door is released, by a spring 25 which is contained in a mortise 26 formed in the latch, and bears against an axle 27 secured to the body 8.

In the present case, the door is applied against its frame 2 by twelve latches 20 which are suitably distributed around its periphery so as to exert, upon the packing member, a pressure which is balanced at all points. Obviously, the number and the distribution of such latches may be as desired.

The said latches are actuated by means of levers 28 (Figs. 3—4) pivotally mounted on axles 29, and of balls (or rollers) 30, which are disposed in one or more rows or piles. In the present embodiment, there are employed four rows A—A'—B—B'.

The balls 30 are guided by ribs 31 formed in the body 8, and are held against the said body, as well as all the levers 28 and the latches 20, by the panel 11 which is secured by screws 10. A certain play is allowed in order to permit these parts moving according to the plane of the body 8.

A certain number of the balls 30ª are spaced from the axis of the corresponding row or pile of balls 30 and are in contact, respectively, with one of the levers 28. Openings 32 (Fig. 3) of suitable form are provided in the corresponding rib 31 in order to give passage to the balls 30ª.

On the other hand, the balls 30ᵇ situated at the ends of the rows or piles of balls are indeed located on the axis of the corresponding row, but they serve the same purpose as the balls 30ª and are in contact with the respective levers 28.

The balls 30ᶜ which are situated at the other end of each row or pile are in contact with one or the other of two cams 33 (Fig. 3) pivoted on the axles 34 in forked brackets 35. One of the brackets is mounted with a right-hand thread and the other with a left-hand thread, upon a threaded shaft 36 whose axis is parallel with the plane of the body 8 and is perpendicular to the axis of the row of balls 30. A worm wheel 37 drives the shaft 36 by means of a key 38. The said shaft is adapted for lateral movement in the worm wheel 37 which is actuated by a worm-wheel 39 on whose shaft is mounted a cross-shaped operating device 41 (Figs. 1 and 2). The said worm-wheels 37 and 39 are contained in a case 42 which is secured to the body 8.

The operation is as follows. The door being closed in the first place, in the same way as an ordinary door of a room, the packing member 17 makes contact with the bead 5 of the frame 2. The door is then locked by operating the cross-shaped device 41 which actuates the worm-wheel 39. By the action of the worm wheel 37, the shaft 36 rotates, and due to its threads and to the brackets 35 it operates the cams 33 which move towards each other. In their movement, the said cams exert a pressure upon the balls 30ᶜ in the direction of the axis of the rows of balls A—A'—B—B'. Each ball 30 pushes the next one, and so on, as far as the last ball 30ᵇ. The balls 30ª and 30ᵇ, in contact with their respective levers 28, drive this latter in each case, and the lever drives the corresponding latch 20 into the staple 6 adjacent the same. The rollers 22 of the latches 20 then meet the inclined planes 7 of the staples 6, and due to the pressure, they oblige the entire door to move in the direction perpendicular to the plane of the body 8, i. e., in such direction that the packing member 17 will be flattened against the bead 5 of the frame 2, and thus the door will be tightly fitted.

As will be observed, owing to the arrangement of the latches 20, the balls 30—30ª—30ᵇ—30ᶜ, and the several parts of the operating mechanism, the pressure resulting from the action exerted upon the cross-shaped device 41 will be automatically distributed upon all of the latches 20, and hence upon the whole surface of the packing member 17, in a uniform manner and at the same time.

It will be noted that each row A—B—A' or B' of balls 30 actuates three door-latches. None of these three latches can press against the corresponding staple unless the other two latches are also being pressed, since it bears against them by means of the levers 28 and the intermediate balls 30.

On the other hand, the rows or piles of balls 30 A—B or A'—B' are separated by the cams 33. As the said cams are pivoted in the brackets 35, none of them can press upon one of the rows of balls 30 unless the row of balls opposite this row, on the same axis, is also at the same point of the pressure.

As the shaft 36 is free to move laterally in the worm wheel 37, it cannot exert any traction upon a given cam 33 unless the other cam is at the same point of the pressure, since it bears against one cam in order to draw the other.

For this reason, a given latch 20 will not be able to press the door against its frame unless all the others are exerting the same pressure, thus affording an exact distribution of the pressure upon the whole surface of the packing member, this taking place by a single and very rapid operation.

Figure 6:
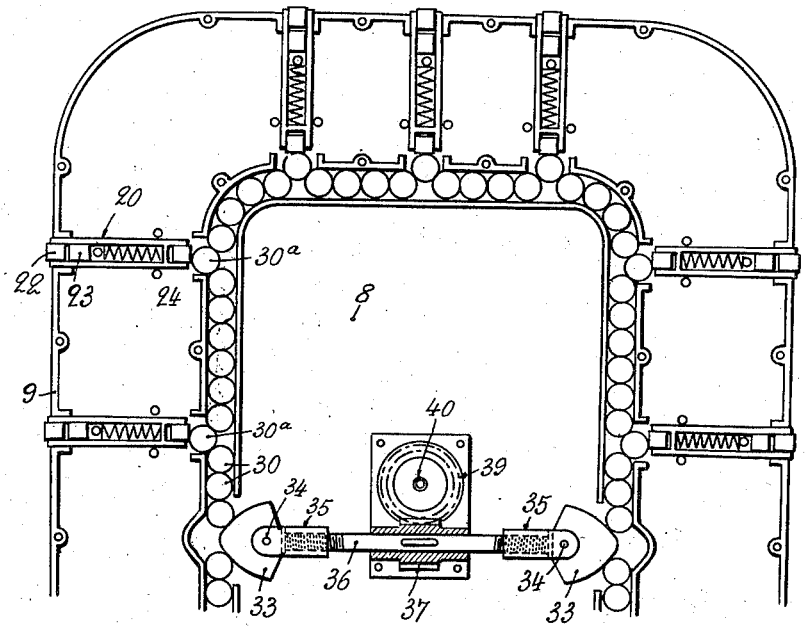
Fig. 6 shows by way of modification, another arrangement of the balls and the operating mechanism.

Fig. 6 shows a modification in which the rows of balls or rollers 30 follow the shape of the door or panel, and this device can be used when the apparatus requires a certain number of latches 20 on each of its sides. In this modification, the spreading cams 33 are driven outwardly by their operating shaft instead of being drawn inwardly. The balls or rollers 30 act directly upon the latches 20 without the use of an intermediate lever.

Obviously, the said invention is not limited to the embodiments herein described and represented, which are given solely by way of example.

The apparatus may be stationary or movable, that is, on the contrary to what has been represented, the mechanism with its door-latches, hooks, or like devices might be mounted upon the stationary part, such as the frame 2, and the staples 6 or the like, upon the movable part, such as the door.

The door may be of the sliding type, or may consist of a panel which is simply applied manually or otherwise, before it is locked in place.

The position of the packing member 17 and its form may be as desired. It can be inserted in place, or not, and may be mounted in the frame 2 instead of on the door.

If necessary, the door may not be provided with such packing, and in this case, the faces of the door of the frame which are adapted to make contact will be trimmed off in consequence.

The staples 6 may be provided with rollers, and they may also be replaced by a general groove which follows the periphery of the frame and has the same cross-section as the staples.

The number of balls or rollers, and their size, distribution and arrangement, may be as desired. The intermediate balls or rollers may be replaced by any other connecting means.

The operating mechanism herein represented may be of any other type or may be replaced by any other device of suitable form for spreading the balls apart. The driving means may be manual, mechanical, electrical, hydraulic, pneumatic, or the like.

The door or other device may be provided with several driving mechanisms, whether combined or separate.

A single driving mechanism can act upon a single row of balls or rollers, which latter follow around the door or panel.

Obviously, the invention is susceptible of all applications of manifold operating for doors, panels or apparatus which are not tightly fitted, and in this case the staples or the peripheral groove in the frame may be used with or without an inclined plane.

In like manner, the invention is applicable to the operating of manifold push-pieces, hooks, levers or the like, for all desired apparatus, for the simultaneous feed of tools and in general for the simultaneous operating of several parts of any kind.

Having now described my invention what I claim as new and desire to secure by Letters Patent is:

1. In combination, operating means, a plurality of movable elements adapted to be moved against a resistance, main guiding means having one end against said operating means, for each of said elements auxiliary guiding means communicating at one end with said main guiding means and extending at the other end opposite said corresponding element, in each auxiliary guiding means a rolling member adapted to slide both longitudinally and transversely in said auxiliary guiding means and to operate the corresponding element when sliding longitudinally, in the main guiding means and opposite each auxiliary guiding means, two rolling members in contact with said rolling member in said auxiliary guiding means on either side of said last mentioned rolling member and a rolling member in contact with said operating means, spacing means in said main guiding means adapted to maintain an invariable distance in said main guiding means between the different groups of two rolling members carresponding to said auxiliary guiding means and to maintain an invariable distance between said operating means and the group of two rollers in said main guiding means which is the nearest said operating means, whereby said elements are adapted to be moved by said operating means and to receive different relative displacements with respect to each other.

2. Latching construction for a panel adapted to close an opening in a frame structure provided with retaining means, comprising a number of locking means on said panel adapted to be moved into and out of engagement with said retaining means, operating means mounted on said panel, main guiding means having one end adjacent said operating means, for each of said locking means auxiliary guiding means communicating at one end with said main guiding means and extending at the other end opposite said corresponding locking means, in each auxiliary guiding means a rolling member adapted to slide both longitudinally and transversely in said auxiliary guiding means and to operate the corresponding locking means, in the main guiding means for each auxiliary guiding means two rolling members in contact with said rolling member in said auxiliary guiding means on either side of said last mentioned rolling member and a rolling member in contact with said operating means, spacing means in said main guiding means adapted to maintain an invariable distance in said main guiding means between the groups of two rolling members corresponding to said auxiliary guiding means and to maintain an invariable distance between said operating means and the group of two rollers in said main guiding means which is the nearest said operating means, whereby said locking means are adapted to be brought into engagement with said retaining means and to receive different relative displacements with respect to each other.

3. Latching construction for a panel adapted to close an opening in a frame structure provided with retaining means, comprising operating means mounted on said panel and adapted to be moved substantially in two opposite directions, at least two cam surfaces carried on said operating means and inclined in opposite directions with respect to the said directions in which said operating means are adapted to be moved, two groups of locking means on said panel adapted to be moved into and out of engagement with said retaining means, main guiding means between each of said cam surfaces and the corresponding groups of locking means, each of said main guiding means having one end adjacent one of said cam surfaces, for each of said locking means auxiliary guiding means communicating at one end with said main guiding means and extending at the other end opposite said corresponding locking means, in each auxiliary guiding means a rolling member adapted to slide both longitudinally and transversely in said auxiliary guiding means and to operate the corresponding locking means, in the main guiding means for each auxiliary guiding means two rolling members in contact with said rolling member in said auxiliary guiding means on either side of said last mentioned rolling member and a rolling member in contact with said cam surfaces, spacing means in said main guiding means adapted to maintain an invariable distance in said main guiding means between the groups of two rolling members corresponding to said auxiliary guiding means and to maintain an invariable distance between said cam surfaces and the group of two rollers in said main guiding means which is the nearest said cam surfaces.

4. Latching construction for a panel adapted to close an opening in a frame structure provided with retaining means, comprising operating means mounted on said panel and provided with a pivot adapted to be reciprocated, a cam pivoted on said pivot and provided with two operative surfaces on either side of said pivot, two groups of locking means on said panel adapted to be moved into and out of engagement with said retaining means, main guiding means between each of said operative surfaces and the corresponding groups of locking means, each of said main guiding means having one end adjacent one of said operative surfaces, for each of said locking means auxiliary guiding means communicating at one end with said main guiding means and extending at the other end opposite said corresponding locking means, in each auxiliary guiding means a rolling member adapted to slide both longitudinally and transversely in said auxiliary guiding means and to operate the corresponding locking means, in the main guiding means for each auxiliary guiding means two rolling members in contact with said rolling member in said auxiliary guiding means on either side of said last mentioned rolling member and a rolling member in contact with said operative surfaces, spacing means in said main guiding means adapted to maintain an invariable distance in said main guiding means between the groups of two rolling members corresponding to said auxiliary guiding means and to maintain an invariable distance between said operative surfaces and the group of two rollers in said main guiding means which is the nearest said operative surfaces.

5. Latching construction for a panel adapted to close an opening in a frame structure provided with retaining means, comprising an operating shaft adapted to be rotated and to slide axially and provided at one end with right-handed and on the other end with left-handed threads, at each end of said shaft a nonrotatable sleeve adapted to engage the corresponding threaded end of said shaft, whereby said sleeves are adapted to be brought towards and away from each other, two cams connected with said sleeves, two groups of locking means on said panel adapted to be moved into and out of engagement with said retaining means, main guilding means between each of said cams and the corresponding group of locking means, each of said main guiding means having one end adjacent one of said cams, for each of said locking means auxiliary guiding means communicating at one end with said main guiding means and extending at the other end opposite said corresponding locking means, in each auxiliary guiding means a rolling member adapted to slide both longitudinally and transversely in said auxiliary guiding means and to operate the corresponding locking means, in the main guiding means for each auxiliary guiding means two rolling members in contact with said rolling member in said auxiliary guiding means on either side of said last mentioned rolling member and a rolling member in contact with said cams, spacing means in said main guiding means adapted to maintain an invariable distance in said main guiding means between the groups of two rolling members corresponding to said auxiliary guiding means and to maintain an invariable distance between said cams and the group of two rollers in said main guiding means which is the nearest said cams.

LUCIEN LOUIS JOSEPH PROMPT.